United States Patent
Trossen

(10) Patent No.: US 7,415,268 B2
(45) Date of Patent: Aug. 19, 2008

(54) METHOD AND APPARATUS TO PROVIDE CHARGING FOR AD-HOC SERVICE PROVISIONING BETWEEN TRUSTED PARTIES AND BETWEEN UNTRUSTED PARTIES

(75) Inventor: Dirk Trossen, Cambridge, MA (US)

(73) Assignee: Nokia Corporation, Espoo (FI)

( * ) Notice: Subject to any disclaimer, the term of this patent is extended or adjusted under 35 U.S.C. 154(b) by 191 days.

(21) Appl. No.: 10/792,181

(22) Filed: Mar. 2, 2004

(65) Prior Publication Data

US 2005/0197098 A1 Sep. 8, 2005

(51) Int. Cl.
*H04M 11/00* (2006.01)
(52) U.S. Cl. ............ 455/406; 455/407; 455/408; 455/405
(58) Field of Classification Search .......... 455/406, 455/405, 407, 408, 410, 422.1, 41.2
See application file for complete search history.

(56) References Cited

U.S. PATENT DOCUMENTS

| | | | |
|---|---|---|---|
| 2002/0071416 A1 | 6/2002 | Carlson et al. | 370/338 |
| 2003/0054796 A1* | 3/2003 | Tamaki et al. | 455/406 |
| 2003/0061358 A1* | 3/2003 | Piazza et al. | 709/227 |
| 2003/0220074 A1 | 11/2003 | Wee et al. | 455/11.1 |
| 2004/0117358 A1* | 6/2004 | von Kaenel et al. | 707/3 |
| 2004/0123118 A1* | 6/2004 | Dahan et al. | 713/189 |
| 2004/0142686 A1* | 7/2004 | Kirkup et al. | 455/420 |

FOREIGN PATENT DOCUMENTS

| | | |
|---|---|---|
| EP | 1215853 A2 | 6/2002 |
| EP | 1339210 A1 | 8/2003 |
| JP | 02002209028 A * | 7/2002 |
| WO | WO-02/51038 A1 | 6/2002 |
| WO | WO-2004/043008 A1 | 5/2004 |

OTHER PUBLICATIONS

James Haartsen, Bluetooth-The universal radio interface for ad hoc, wireless connectivity, XP-000783249, Nov. 1998.
M. Frodigh, P. Johansson & P. Larson, Wireless ad hoc networking—The art of networking without a network, XP-000969933 , Nov. 4, 2000.

* cited by examiner

*Primary Examiner*—Joseph Feild
*Assistant Examiner*—Huy D Nguyen
(74) *Attorney, Agent, or Firm*—Harrington & Smith, PC

(57) ABSTRACT

A method and a system provide a service for a user device with a service provider. The method includes establishing a service provisioning relationship between the user device and a bridging user device through a first wireless network (e.g., a Bluetooth network); providing a desired service for the user device with the service provider via the bridging user device and the first wireless network, and through a second wireless network (e.g., a cellular network) that couples the bridging user device to the service provider; while providing the service, recording charging data for the service provisioning relationship between the user device and the bridging user device; and reporting the charging data from the bridging user device to the service provider. In the preferred embodiment at least the establishing and recording functions use service provider trusted software running on the user device and on the bridging user device.

34 Claims, 3 Drawing Sheets

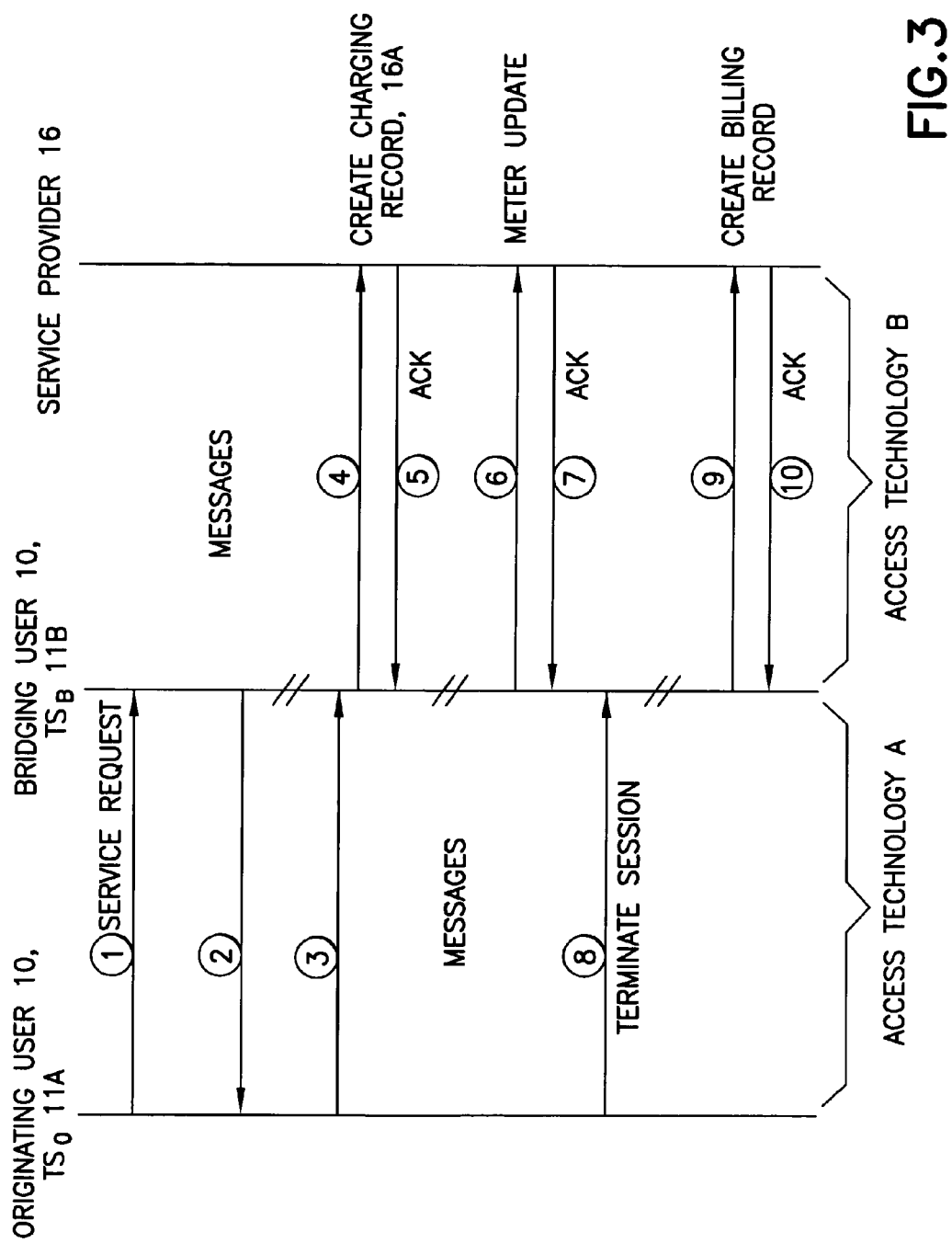

METHOD AND APPARATUS TO PROVIDE CHARGING FOR AD-HOC SERVICE PROVISIONING BETWEEN TRUSTED PARTIES AND BETWEEN UNTRUSTED PARTIES

TECHNICAL FIELD

This invention relates generally to data communications conducted over data communications networks and, more specifically, relates to techniques for charging for services that are provided in an ad-hoc fashion between possibly untrusted parties.

BACKGROUND

The background of, and the problems solved by, this invention can be most conveniently illustrated through the use of examples.

For example, FIG. 1 illustrates a conventional gaming scenario where a group of users, physically located in a room, play a multi-player game using terminals 1A via a local access technology such as a wireless Bluetooth™ network 2. The terminals 1A may be mobile terminals, such as cellular telephones or gaming devices per se, and their users are referred to herein for convenience also as originating users. In addition to the physically present players another, remotely located player having a terminal 1B, also referred to herein for convenience as a correspondent user, may wish to participate in the game through another access technology, such as a cellular link made through a cellular network 3, via one of terminals 1A' of the local game participants.

A problem that arises is that the game participant associated with terminal 1A', also referred to herein for convenience as a bridging user, is providing the use of his or her cellular link 3 for a common purpose, i.e., the connection to the game server or a point-to-point connection to the remote participant 1B. Typically, the mobile terminal 1A' functions as a bridge or router between the Bluetooth local network 2 and the cellular network 3. In most cases the usage of the cellular link 3 results in charging the cellular account of the bridging user, while the other game participants (the originating users) are not charged for the usage of the cellular link 3, even though they are also using the link 3. For example, the terminals 1A may all be sending data packets through the bridging terminal 1A', via the Bluetooth access network 2, to the remote participant 1B, or when contacting a remote game server (not shown) through the Internet. Hence, there is likely to be a lack of incentive for the user of the bridging terminal 1 A' to provide the other users access to his or her cellular link 3 for the purpose of gaming, without having the other participants charged appropriately.

As a further example, consider a user with a laptop computer who wishes to connect when in a public place to the Internet. Assume that the user's laptop does not provide cellular access, that there is no hotspot available in order to use a wireless local area network (WLAN), but that the laptop computer does have a Bluetooth interface providing Bluetooth access.

In this case the user's laptop may connect via the Bluetooth interface to the mobile terminal of some nearby user, such as by using conventional Bluetooth service discovery procedures in order to connect to an appropriate mobile terminal. The nearby user's mobile terminal's cellular connectivity is then used, possibly unbeknownst to the nearby user, to route the laptop's packets appropriately to the Internet (assuming that an IP profile for Bluetooth is present). However, since the cellular link of the nearby bridging mobile station is used, this user's cellular account would be charged for the services that are actually consumed by the laptop user, who may be unknown to the bridging mobile station user.

In addition to the aforementioned problems related to the charging the bridging user's cellular account, a further problem arises in the context of the use of resources. That is, the use of the cellular link 3 not only adds costs to the bridging user's cellular account, but also consumes mobile station resources, most importantly the battery power of the mobile station of the bridging user. Other resources that can be consumed include the decoding functionality of the mobile station, as well as connectivity to certain peripherals. The result is that a first mobile station is caused to function, perhaps unwittingly, as a service provider for a second mobile station whose user may be totally unknown to the user of the first mobile station. This situation may be referred to generally as ad-hoc service provisioning. One result of providing ad-hoc service provisioning is that there may be a desire of the bridging mobile station user to also charge for the consumption of the mobile station's resources, in addition for the cellular connectivity costs.

In U.S. Published Patent application Ser. No.: US 2002/0071416, Jun. 13, 2002, "Ad Hoc Wide area Network Access Method and System", G. Carlson et al. describe a method and system for providing a non-connected wireless device with access to a wide area network through a wireless device having a connection facility such as a wireless connection provider or a wireless portal. The non-connected wireless device first employs a short-range wireless communication link to negotiate with at least one wireless connection provider for connection services. Once the non-connected wireless device has selected a particular connection provider, the connection provider provides access to the wide area network resource through the connection facility and measures the usage. The wireless connection provider then bills the non-connected wireless device for the provided connection services, and the non-connected wireless device provides payment information to the wireless connection provider for enabling payment.

The foregoing technique appears to assume that a trusted relationship exists between the originating user and the bridging user. However, in many cases this will not be the case, and in fact the bridging user may be unaware that his mobile terminal is providing a bridging service for another, possibly unknown user.

SUMMARY OF THE PREFERRED EMBODIMENTS

The foregoing and other problems are overcome, and other advantages are realized, in accordance with the presently preferred embodiments of these teachings.

This invention both addresses and solves the foregoing problems by the use of a method and a system that enables charging for ad-hoc service provisioning, between trusted parties and also between untrusted parties.

In the preferred embodiments of this invention the bridging user can be associated with any mobile station, or mobile terminal, or computer, collectively referred to for convenience as a wireless device, that has bridging and charging capability in an ad hoc environment. While it is assumed that the originating user has a trusted relationship with a service provider, such as an Internet Service Provider (ISP), a trusted relationship between the originating user and the bridging user is not required. The bridging user may be any person equipped with a wireless device that engages in ad-hoc networking.

In accordance with the presently preferred embodiment of this invention the service provider, such as an ISP, provides trusted and protected code that runs on the bridging user's wireless device, and the originating user is responsible for negotiating and communicating the negotiation result to the ISP, as well as for metering and logging the usage of the resource(s), such as the cellular link, by the originating user. The originating user's logged usage on the bridging user's wireless device is communicated as accounting information to the ISP in an authenticated manner, i.e., without the possibility of a rogue bridging user altering or spoofing the provided accounting information. The service provider, such as the ISP, bills the originating user for his usage based on the received accounting information, and may pay or credit the bridging user a commission fee for acting as agent of the ISP.

A method and a system of this invention provide a service for a user device with a service provider. The method includes establishing a service provisioning relationship between the user device, also referred to as an originating user device, and a bridging user device through a first wireless network (e.g., a Bluetooth network); providing a desired service for the user device with the service provider via the bridging user device and the first wireless network, and through a second wireless network (e.g., a cellular network) that couples the bridging user device to the service provider; while providing the service, recording charging data for the service provisioning relationship between the user device and the bridging user device; and reporting the charging data from the bridging user device to the service provider. In the preferred embodiment at least the establishing and recording functions use service provider trusted software running on the user device and on the bridging user device.

Embodiments of mobile devices and mobile terminal, such as cellular telephones, that are suitably constructed and operated for realizing the originating user device and the bridging user device are also described.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3 is a signal flow diagram in accordance with the system architecture embodiment shown in FIG. 2.

DETAILED DESCRIPTION OF THE PREFERRED EMBODIMENTS

Figure 1:
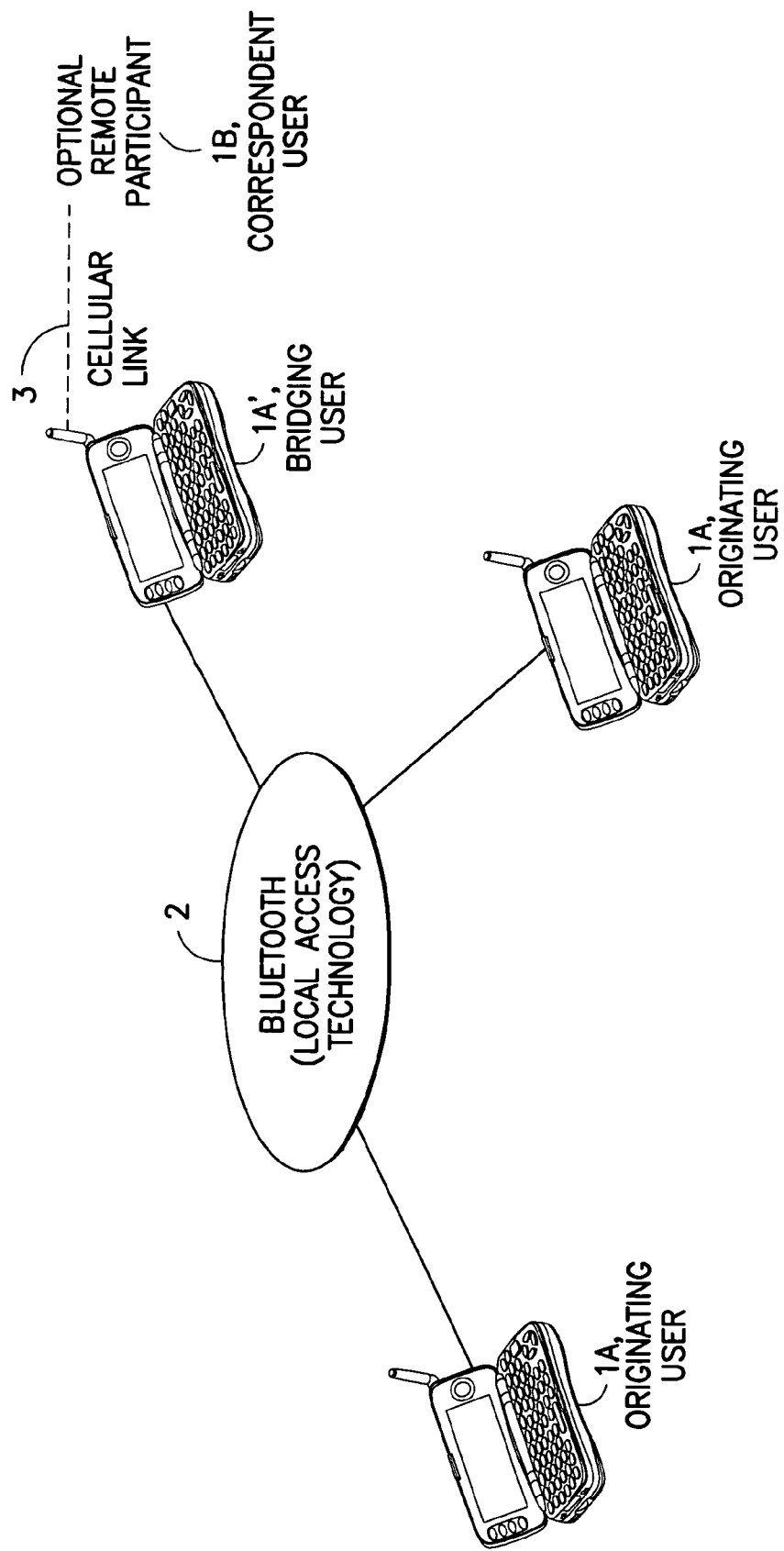
FIG. 1 is a simplified block diagram of a conventional usage scenario, specifically one involving local game participants and at least one remote game participant.
Figure 2:
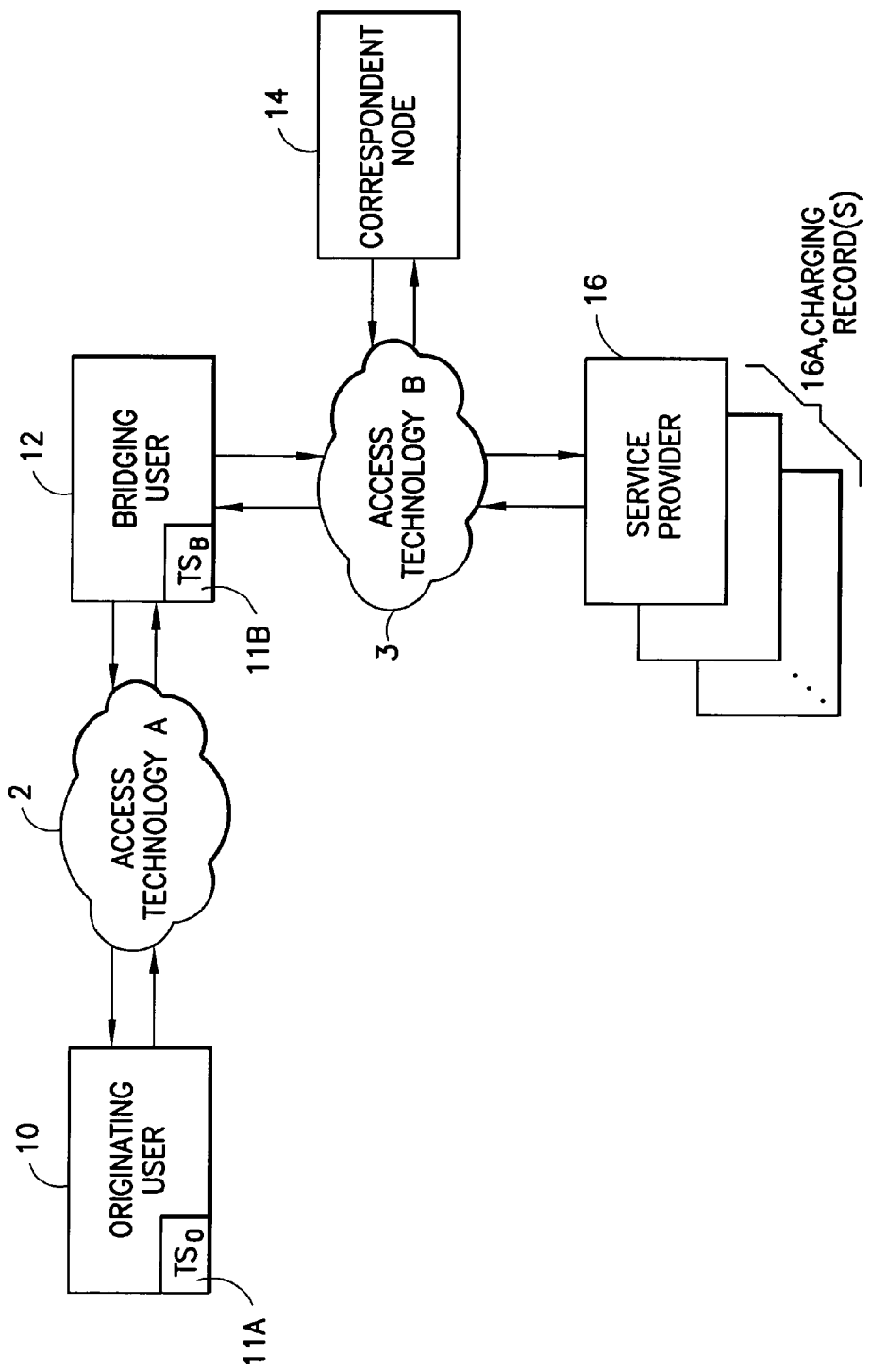
FIG. 2 is a block diagram that illustrates an embodiment of a system architecture in accordance with this invention.

Described below, in accordance with preferred embodiments of this invention, is a method and a system to charge for the service provisioning by a user of another, possibly untrusted, user. Referring to FIG. 2, each user is assumed to be associated with a wireless device 10, 12. The wireless devices could be, as non-limiting examples: a mobile station or a mobile terminal, such as a cellular telephone, a personal communicator, or a gaming device; an Internet appliance; or a desktop or a portable computer. Typically the users will be mobile users, although this is not a restriction on the practice of this invention. In general, the wireless device has a first wireless interface to a local, typically restricted range communications network or access technology 2, such as WLAN or a Bluetooth network (shown as Access Technology A). For example, a typical operating range between devices for a Bluetooth network, assuming normal operating power levels, is about 10 meters. In general, at least the wireless device 12 associated with the bridging user has a second wireless interface 3 (shown as Access Technology B), such as a cellular interface that could be, as non-limiting examples only, a cdma2000 interface or a GSM/UMTS interface, or any suitable interface enabling the wireless device 12 of the bridging user to contact and establish a connection with a service provider 16 and/or with a remote user, the correspondent user or node 14, that may be associated with another wireless device. Typical ranges for cellular links are kilometers and tens of kilometers. Furthermore, the cellular network operator will typically provide access to global data communications networks, such as the Internet.

Note that the service provider 16 may be the cellular network operator, or it may be an ISP. The correspondent node 14 is considered to be the endpoint of the communication with the originating user 10 via the bridging user 12. The correspondent node 14 can be any node in the Internet, or a peripheral, or another mobile device, depending on the Access Technology B and the application scenario in which the invention is used. Note that the Access Technologies A and B do not necessarily have to be different for certain services. Further, certain service usage scenarios do not require the correspondent node 14, such as a service that uses transcoding services at the bridging user 12.

A third party is used to establish a trusted relationship between possibly unknown users. The third party, which in many cases will be the service provider 16, provides a certified unit of code ($TS_O$ 11A) for the originating user 10, as well as for the bridging user 12 ($TS_B$ 11B). The provided third party code monitors and accounts for particular service usage based on at least one predetermined usage metric. Non-limiting examples of suitable usage metrics include bytes, packets and transaction counts. The third party code monitors the service usage, such as IP forwarding, according to the agreed upon usage metrics.

The bridging user 12 may request that the current metric instance to be sent by the third party code for payment at any time during the transactions, preferably though at the end of the transactions. For this purpose the invention also provides a method to agree upon the charging with third party that is used for billing the originating user 10.

It is assumed that the originating user 10 and the bridging user 12 have a subscription with the service provider 16. As a consequence of this subscription both mobile devices have installed the unit of code 11, provided by the service provider 16, that performs the charging and monitoring functions. These units of code are those depicted as $TS_O$ and $TS_B$. Also as a consequence of the subscription both users 10 and 12 have a charging relationship with the service provider 16 in the sense that they provide appropriate billing information, such as credit card information, to the service provider 16. Also as a consequence of the subscription the service provider 16 maintains an appropriate set of credential information for either user 10 or 12 in order to perform a negotiation during the establishment of the charged session, as described below. This set of credentials typically includes necessary key information as well as mobile device identifiers.

In order to implement a charged session in accordance with the teachings of this invention, appropriate information is established in order to initiate and conduct the session. FIG. 3 shows an example of the signalling that is involved. It should be noted that the communication between the originating user 10 and the bridging user 12 occurs via Access Technology A (e.g., through the Bluetooth network 2), while the communication between the bridging user 12 and the service provider 16 occurs via Access Technology B (e.g., through the cdma2000 cellular network).

In FIG. 3 it is assumed that the software units for $TS_O$ and $TS_B$ have been previously installed on the mobile devices 10 and 12. This can occur by the service provider 16 downloading the software units over-the-air to at least the mobile device 12, which then transfers $TS_O$ in an authenticated manner over the Access Technology A to the mobile device of the originating user 10, or by any suitable technique.

$TS_O$ of the originating user 10 sends a message (message$_1$) to $TS_B$ of the bridging user 12. The addressing of this and other messages between the mobile devices can be realized by any suitable means. A presently preferred, but non-limiting addressing technique is one known as "application layer addressing". This technique can be implemented through, for example, addressing particular IP ports, or by using Uniform Resource Identifier (URI) addressing. As a result, the trusted units of code $TS_O$ and $TS_B$ exchange messages on the application layer.

The service request message, sent from $TS_O$ includes at least a description of the service that is desired to be used at the bridging user 12. This service description is sufficient to initiate appropriate monitoring at the bridging user 12, as discussed below. The message$_1$ of $TS_O$ also includes a description of the metric to be used for charging, such as byte or transaction count. Additionally, the message$_1$ may include cost information related to the originating user 10, for example, the cost that the originating user 10 would pay for a particular service.

Upon reception of message$_1$ at the bridging user 12, $TS_B$ extracts the information and either accepts or rejects the request. For example, the request may be rejected if the requested service is not supported by $TS_B$ with respect to an appropriate monitoring technique. If the request is accepted, $TS_B$ determines usage costs for the particular requested metric and sends a response (message$_2$ in FIG. 3) back to $TS_O$ of the originating user 10. The determination of the costs may be based upon information in configuration files, stored at the bridging user 12 and configured through the user prior to engaging in the particular session. Or the user may be requested by $TS_B$ (e.g., in form of a dialog box) to establish a particular cost metric for the session upon the reception of message, at the bridging user 12. The costs typically, but not necessarily, depend on the actual costs for provisioning the service at the bridging user 12, e.g., the cost for transfer of bytes within Access Technology B. In addition, charges may be added for the use of local resources, such as processing and/or battery power. In addition, information made available in message$_1$ regarding cost expectations of the originating user 10 may be incorporated in the decision as well.

Upon reception of message$_2$ at the $TS_O$ of the originating user 10, the specified costs for provisioning the requested service at the bridging user 12 can be accepted or rejected. This acceptance can be similar to the determination of the costs at the bridging user 12, e.g., based upon certain pre-configured information, or a dialog box that requests the confirmation of the originating user 10 regarding the cost(s).

If the service charge is rejected by the originating user 10, the sequence of message, and message$_2$ may occur again. In this case the second instance of message$_1$ can include revised cost information related to the originating user 10, for example, a revised cost that the originating user 10 is willing to pay for the requested service. The revised proposed cost may be greater than what was indicated in the first instance of message$_1$, but less than the cost that the bridging user 12 indicated that he was willing to accept in the first instance of message$_2$. This mechanism thus implements an offer-counteroffer model of negotiation between the originating user 10 and the bridging user 14, and can continue automatically or with user input until both the originating user 10 and the bridging user 12 are satisfied.

Assuming now that the originating user 10 and the bridging user 12 finally agree on an acceptable service charge, $TS_O$ of the originating user 10 sends message$_3$ to $TS_3$ of the bridging user 12. Message$_3$ contains the service charge information that was agreed upon in the sequence of message, and message$_2$, and preferably also contains appropriate credential information required at the service provider 16, such as a mobile device or terminal identifier and also possibly an encrypted password.

Upon reception of message$_3$ in FIG. 3, the $TS_B$ 11B of the bridging user 12 forwards the information to the service provider 16 as message$_4$. Upon reception of message$_4$ at the service provider 16, one of the charging records 16A is created by the service provider 16, using the received service charge and the mobile terminal identifier. After creating one of the charging records 16A, the service provider further generates a locally unique session identifier for this charging record that is used in future communications to uniquely identify the charged session. If used, the encrypted password is employed to authenticate and authorize the service charge to be made. The service provider 16 acknowledges (ACKs) the creation of the charged session by sending message$_5$ to the bridging user 12. Upon reception of the message$_5$, the $TS_B$ 11B of the bridging user 12 extracts the enclosed session identifier for future use.

Having thus established the charging record, the system is equipped to begin metering and charging the originating user 10. More specifically, after the establishment of the charging record information at the service provider 16, in response to receiving message$_4$, the $TS_B$ 11B at the bridging user 12 initiates an appropriate monitoring function to meter the agreed upon service usage. For example, for a service such as "IP routing", appropriate byte counters may be instantiated that are increased based on monitoring the IP forwarding functionality at the bridging user 12. Other types of suitable monitoring functions include the use of a packet counter, a transaction counter in a browser, and one or more resource consumption recorders such as one that keeps track of the bridging user mobile device data processing cycles devoted to servicing the originating user, or some other data processing metric, and/or primary power (e.g., battery power) consumption recorders.

During the lifetime of the session the $TS_B$ 11B of the bridging user 12 performs the appropriate metering of the service usage, such as counting forwarded IP packets. It should be noted that the specifics of the actual underlying service are not within the scope of the invention.

At any time during the session, the metering information can be sent as message$_6$ from the $TS_B$ 11B of the bridging user 12 to the service provider 1. The message$_6$ includes at least the session identifier, as well as the current meter value. The service provider 16 stores the metering information accordingly within the appropriate charging record (identified through the session identifier) and acknowledges the reception by sending message$_7$ back to the $TS_B$ 11B of the bridging user 12. Note that the use of message$_6$ and message$_7$ is optional, as only the final meter value need be sent at session termination (message$_9$), as described below.

The session can be terminated explicitly through the $TS_O$ 11A of the originating user 10 by sending an appropriate session termination message$_8$ to the $TS_B$ 11B of the bridging user 12. Alternatively, a local decision at the bridging user 12 may be used to terminate the session. In either case, the $TS_B$ 11B of the bridging user 12 sends a terminate charging message$_9$ to the service provider 16. The terminate charging message$_9$ contains at least the current meter value(s), the session identifier, and an indication to terminate the session. Upon reception at the service provider 16, an appropriate billing record for the originating user 10 is created, based on the available meter information as well as the agreed service charge. The operation is then confirmed towards the $TS_B$ 11B of the bridging user 12 by sending message$_{10}$. Upon reception of message$_{10}$, the $TS_B$ 11B of the bridging user 12 tears down the metering and monitoring functions for the terminated session.

Note that it is not within the scope of the invention to specify exactly how the foregoing information is actually described, although XML (Extended Markup Language) or RDF (Resource Description Format) techniques are well suited for this purpose.

Based on the foregoing description it should be apparent that this invention significantly improves on the conventional approaches by providing a generic solution that can be used for a number of different service usage scenarios, such as bridging between access technologies, and does not rely on scenario-specific solutions. The inherent lack of trust between possibly unknown mobile users is overcome through the use of certified and trusted metering and monitoring software ($TS_O$ and $TS_B$) that is offered through a common service provider 16 with which both the originating and the bridging users have a subscription. Further, the use of this invention permits a charging negotiation process to occur through the offer-counteroffer negotiation model during the establishment phase of the charged session (via the message$_1$/message$_2$ interchange).

The service provider-based solution can be totally independent of a particular wireless network operator, as it does not require extensions to the operator networks, nor does it rely on any specific operator functionality. Therefore, it enables mobile device based services that are charged on the application level rather than on an access network subscription level.

Further, the trusted software ($TS_B$ and $TS_O$) maybe preloaded on and integrated with the software of the mobile devices, thereby providing uniformity and a common trusted charging standard that can be used across various network operators and service providers. In this case the trusted software ($TS_B$ and $TS_O$) can be integrated into mobile devices provided by a mobile device manufacturer, for performing the charging and metering functions, while the service provider 16 software functions can be provided by the mobile device manufacturer as well or by or through a third party.

The use of this invention further minimizes the overhead to the bridging user's device 12 with respect to metering, as relatively simple metric operations, such as implementing a simple byte or packet counter, can be used.

In one exemplary use case of this invention, assume that a user brings a cellular telephone, PDA or a laptop having a Bluetooth interface, and the software $TS_O$ already installed or installable, to an airport and, while waiting for a flight, decides to surf the Internet. Assume further that no Internet access company services the airport. However, the user discovers through ad-hoc Bluetooth networking that some nearby person with an Internet connection will serve as the bridging user 12 to access the Internet. This person is also assumed to be functioning in the role of an agent for the user's ISP, i.e., this person has some trusted and protected code from the user's ISP that enables the user to access the Internet, as well as to meter and charge the user appropriately and securely for the user's Internet usage ($TS_B$). The user, who in this scenario functions as the originating user 10, is subsequently billed by the ISP for his or her Internet usage while located at the airport, while the ISP directly pays the bridging user 12, or otherwise compensates the bridging user (e.g., with free usage minutes).

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

As but some examples, the use of other similar or equivalent messages, numbers of messages and message contents may be attempted by those skilled in the art. Further, in some embodiments of this invention there may be no provision for the charging negotiations to occur between the originating and bridging users, e.g., the bridging user 12 may simply advertise a fixed charging amount that is either accepted or rejected by potential originating users 10. In addition, the bridging user 12 may have multiple instances of the software $TS_B$, each customized for use with a different instance of the service provider 16. In this case, and depending on the specifics of the Access Technology B, the bridging user 12 may provide simultaneous connections to two or more service providers 16 for two or more originating users 10. In a similar manner the originating user 10 may have multiple instances of the software $TS_O$, each customized for use with a different service provider 16. Also, the originating user 10 may be connected at one time to a plurality of service providers 16 though one instance or through multiple instances of bridging users 12.

However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
   establishing a service provisioning relationship between a user device and a bridging user device;
   providing a desired service for the user device with a service provider via the bridging user device;
   while providing the service, recording charging data for the service provisioning relationship between the user device and the bridging user device; and
   reporting the charging data from the bridging user device to the service provider,
   where at least the establishing and the recording use trusted software comprising a certified unit of code running on the user device and on the bridging user device, and where establishing includes at least one message comprising an indication of a requested charging metric is exchanged between the user device and the bridging user device.

2. A method as in claim 1, where the trusted software is obtained from the service provider.

3. A method as in claim 1, where the service provisioning relationship between the user device and the bridging user device is established through a first wireless network comprising a local, short range wireless network, and where the service for the user device is provided via the bridging user device and the first wireless network, and through a second wireless network comprising a longer range wireless network that couples the bridging user device to the service provider.

4. A method as in claim 3, where the first wireless network comprises a wireless local area network (WLAN), and where the second wireless network comprises a cellular wireless network.

5. A method as in claim 3, where the first wireless network comprises a Bluetooth network, and where the second wireless network comprises a cellular wireless network.

6. A method as in claim 3, where recording charging data accounts at least for the use of the second wireless network by the bridging user device.

7. A method as in claim 1, where establishing includes negotiating the specifics of charging for the service provisioning relationship between the user device and the bridging user device using an offer-counteroffer technique.

8. A method as in claim 1, where recording charging data uses at least one charging metric that is negotiated between the user device and the bridging user device when establishing the service provisioning relationship.

9. A method as in claim 1, where recording charging data accounts at least for the consumption of at least one resource of the bridging user device.

10. A method as in claim 1, where reporting occurs periodically while the service is being provided.

11. A method as in claim 1, where reporting occurs at a termination of the service being provided.

12. A method as in claim 1, where the desired service is provided during a session, and where providing the service initially establishes a charging record for the session at the service provider based at least in part on credential information obtained from the user, via the bridging user.

13. A method as in claim 12, where the credential information comprises an identification of the user device, and information that identifies the user to the service provider as being a client of the service provider.

14. A method as in claim 13, where at least the information that identifies the user to the service provider is encrypted.

15. A method as in claim 12, where the charging record for the session is uniquely identified based on a session identifier.

16. The method of claim 1, where the at least one message exchanged between the user device and the bridging user device further comprises a determination of a usage cost for the requested charging metric.

17. A mobile device, comprising:
a data processor coupled to a memory; and
an interface to a first network;
said memory storing computer code executable by said data processor to request a service to be provided by a service provider and to establish a service provisioning relationship between said mobile device and another device through said first network, where said another device is bidirectionally coupled to said service provider through a second network, and where said service is provided for said mobile device by the service provider via said first network, said another device, and said second network, where said computer code comprises trusted software comprising a certified unit of code running on said mobile device and on said another device, and where to establish the service provisioning relationship includes at least one message comprising an indication of a requested charging metric is exchanged between the mobile device and the another device, and where said another device is operable to record charging data related to the service provisioning relationship between said mobile device and said another device, and to report the charging data to said service provider.

18. A mobile device as in claim 17, where said computer code that establishes said service provisioning relationship includes computer code for negotiating specifics of charging for said service provisioning relationship between said mobile device and said another device.

19. A mobile device as in claim 18, where said specifics of charging comprise use of said second network by said another device.

20. A mobile device as in claim 18, where said specifics of charging comprise use of at least one resource of said another device.

21. A mobile device, comprising:
a data processor coupled to a memory;
an interface to a first network; and
an interface to a second network;
said memory storing computer code executable by said data processor to establish a service provisioning relationship between said mobile device and another device through said first network, said computer code comprising trusted software comprising a certified unit of code running on said mobile device and on said another device, where to establish the service provisioning relationship includes at least one message comprising an indication of a requested charging metric is exchanged between the mobile device and the another device, where said mobile device can be bidirectionally coupled to a service provider through said second network, and where said service is provided for said another device by the service provider via said first network, said mobile device and said second network, and where said computer code executable by said data processor further is operable to record charging data for the service provisioning relationship between said mobile device and said another device, and to report the charging data to said service provider via said second network.

22. A mobile device as in claim 21, where said computer code that establishes said service provisioning relationship includes computer code for negotiating specifics of charging for said service provisioning relationship between said mobile device and said another device.

23. A mobile device as in claim 22, where said specifics of charging comprise use of said second network by said mobile device.

24. A mobile device as in claim 22, where said specifics of charging comprise use of at least one resource of said mobile device.

25. A mobile device as in claim 21, where said mobile device reports the charging data periodically while the service is being provided.

26. A mobile device as in claim 21, where said mobile device reports the charging data at a termination of said service being provided.

27. A mobile terminal comprising a data processor coupled to an interface to a first network, said data processor operating to request a service to be provided by a service provider and to establish a service provisioning relationship between said mobile terminal and a device through said first network, where said device is bidirectionally coupled to said service provider through another network, and where said service is provided for said mobile terminal by the service provider via said first network, said device and said another network, where said data processor operates under control of trusted software comprising a certified unit of code stored in said mobile terminal and in said device, where to establish the service provisioning relationship includes at least one message comprising an indication of a requested charging metric is exchanged between the mobile terminal and the device, and where said device is operable to record charging data related to the service provisioning relationship between said mobile terminal and said device, and to report the charging data to said service provider.

28. A mobile terminal as in claim 27, where said data processor is further operable to negotiate charging for said service provisioning relationship between said mobile terminal and said device.

29. A mobile terminal comprising a data processor coupled to an interface to a first network and to an interface to a second network, said data processor operable to establish a service provisioning relationship between said mobile terminal and a device through said first network, where said mobile terminal can be bidirectionally coupled to said service provider through said second network, where said data processor is further operable to exchange at least one message comprising an indication of a requested charging metric between the mobile terminal and the device to establish the service provisioning relationship, and where said service is provided for said device by a service provider via said first network, said mobile terminal and said second network, and where said data processor is further operable to record charging data for the service provisioning relationship between said mobile terminal and said device, and to report the charging data to said service provider over said second network, where said data processor operates under control of trusted software comprising a certified unit of code stored in said mobile terminal and in said device.

30. A mobile terminal as in claim 29, where said data processor is further operable to negotiate charging for said service provisioning relationship between said mobile terminal and said device.

31. A computer program product embodied on a memory and executable by a processor to perform operations on a bridging user device comprising:
   establishing a service provisioning relationship with a user device;
   providing a desired service for the user device with a service provider;
   while providing the service, recording charging data for the service provisioning relationship; and
   reporting the charging data to the service provider,
   where at least the establishing and the recording use trusted software comprising a certified unit of code running on the user device and on the bridging user device, and where establishing includes at least one message comprising an indication of a requested charging metric is exchanged between the user device and the bridging user device.

32. The computer program of claim 31, where establishing includes negotiating the specifics of charging for the service provisioning relationship with the user device using an offer-counteroffer technique.

33. The computer program of claim 31, where recording charging data uses at least one charging metric that is negotiated with the user device when establishing the service provisioning relationship.

34. The computer program of claim 31, where the at least one message exchanged between the user device and the bridging user device further comprises a determination of a usage cost for the requested charging metric.

* * * * *